United States Patent [19]

Kuwajima et al.

[11] Patent Number: 4,522,719
[45] Date of Patent: Jun. 11, 1985

[54] FILTER WITH A TUBULAR FILTER ELEMENT

[75] Inventors: Soichi Kuwajima, Yono; Naojiro Sakamoto, Yokohama, both of Japan

[73] Assignees: Nihon Schumacher K.K., Tokyo; Toyo Element Kogyo Kabushiki Kaisha, Kanagawa, both of Japan

[21] Appl. No.: 564,498

[22] Filed: Dec. 22, 1983

[30] Foreign Application Priority Data

Dec. 24, 1982 [JP] Japan ................................ 57-230880
Aug. 30, 1983 [JP] Japan ................................ 58-157205

[51] Int. Cl.³ ............................................. B01D 27/06
[52] U.S. Cl. ................................. 210/457; 210/493.1; 210/493.2; 55/521
[58] Field of Search ............... 210/437, 446, 448, 451, 210/452, 493.1, 493.2, 457, 493.5, 506, 507; 55/500, 521

[56] References Cited

U.S. PATENT DOCUMENTS

| | | | |
|---|---|---|---|
| 3,692,184 | 9/1972 | Miller et al. | 210/437 |
| 3,937,663 | 2/1976 | Bessiere | 210/493.1 |
| 4,154,688 | 5/1979 | Pall | 210/493.1 |
| 4,193,780 | 3/1980 | Cotton et al. | 210/493.1 |
| 4,218,324 | 8/1980 | Hartmann et al. | 210/493.1 |

FOREIGN PATENT DOCUMENTS 2022436 12/1979 United Kingdom .

Primary Examiner—Richard V. Fisher
Assistant Examiner—Wanda L. Millard
Attorney, Agent, or Firm—Martin Smolowitz

[57] ABSTRACT

A filter has a perforated support tube, a tubular corrugated element wrapped around the support tube, two end plates fitted to the opposite ends of the support tube and a fastening band for fastening the opposite ends of the filter element to the support tube. The support tube is divided into a plurality of filtering portions and a plurality of flexible portions. The filtering portions are solidified at their opposite ends by setting resin. Thus, the replacement of the filter element becomes remarkably simple.

6 Claims, 9 Drawing Figures

FILTER WITH A TUBULAR FILTER ELEMENT

BACKGROUND OF THE INVENTION

This invention relates to a filter using a tubular and corrugated filter element.

Hitherto, in filters using tubular filter elements, the opposite ends of the elements are often glued or bonded to frames, holders or the like. Therefore, when the elements become clogged during filtration operation, both the filter elements and the frames, holders or the like must be discarded. This is uneconomical.

In order to avoid this disadvantage, one of the inventors of this invention invented a new filter which is disclosed in U.K. Pat. No. 2022436. The new filter has a perforated support tube with two end flanges extendinq radially outwardly at its opposite ends. To the flanges are respectively fixed two first clamping elements, each of which clamps the end of the filter element together with one of second clamping elements. The outer circumference of each first clamping element has a zigzag configuration which conforms to the cross section of the filter element. The filter element is placed around the support tube so that it is engaged, at its opposite ends, with the first clamping element, and the second clamping elements are then placed around the filter element. Each second clamping element is compressed inward by a clamping strap so that the filter element is firmly and securely sealed between the first and second clamping elements.

However, in this conventional filter, when the filter element is replaced, much work is required. That is, first, a clamp for fastening each strap is released therefrom. Secondly, each strap is removed from the outer circumference of a respective first clamping element, and then the first clamping element is removed. Thereafter, the old filter element is pulled off from the support tube, and, at last, a new filter element is placed on the first filter elements. This work for the replacement of the filter element is very troublesome and takes a relatively long time.

SUMMARY OF THE INVENTION

It is an object of this invention to provide a filter with a tubular and corrugated filter element, in which an old filter element clogged during filtration operation can be easily and rapidly replaced by a new filter element.

It is another object of this invention to provide a filter with a tubular and corrugated filter element in which a good sealing can be obtained at the positions where the filter element is fixed to a perforated tubular support.

According to this invention, there is provided a filter comprising: a perforated support tube; a tubular filter element wrapped around the support tube, said filter element having a plurality of corrugations in cross section and being divided into a plurality of filtering portions in its circumferential direction so as to form a plurality of flexible portions capable of expanding and, contracting between the two adjoining filtering positions, the opposite ends of each filtering portion being solidified in the form of an arc corresponding to the peripheral surface of the support tube so that a specific pitch of the corrugations can be maintained; two end plates fitted to the opposite ends of the support tube so that the flange portions of the end plates face the end faces of the filter element, respectively; and means for fastening the opposite ends of the filter element to the support tube and against each end plate.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
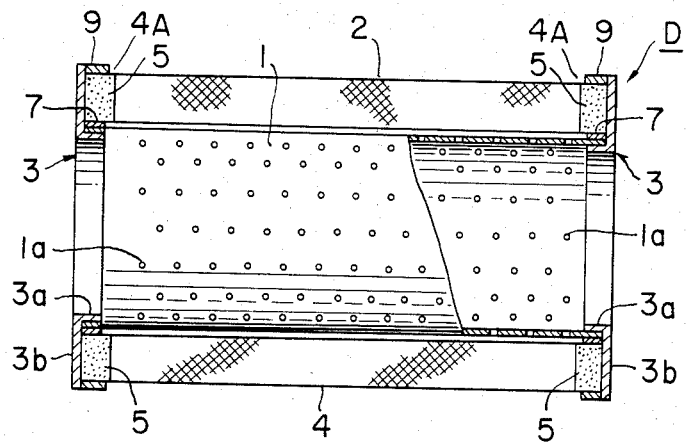
FIG. 1 is a side elevation view in vertical section of a filter according to this invention.

FIG. 1 shows a side elevation view in vertical section of a filter D according to this invention. The filter D has a support tube 1 having a lot of perforations 1a through which liquid to be filtered passes. The outer circumferential surface of the perforated support tube 1 is covered with a cylindrical filter element 2 which is tightly fixed to the support tube 1 at its opposite ends through two end plates 3, 3. Each of end plates 3, 3 is in the shape of a ring, and has a tubular portion 3a inserted into the inner surface of the support tube 1 and a flange portion 3b extending radially outwardly from the tubular portion 3a.

Figure 2:
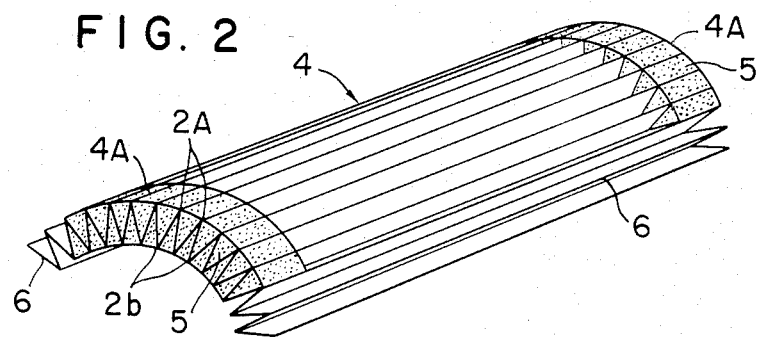
FIG. 2 is a perspective view of a part of the filter element.

The filter element 2 is made of a piece of continuous filter paper corrugated in cross-section, as shown in FIG. 2, and is wrapped around the support tube 1. This filter element 2 has approximately 160 corrugations around the support tube 1 with the corrugation ridges 2a and valley bottoms 2b parallel to the centerline of the support tube 1.

Figure 3:
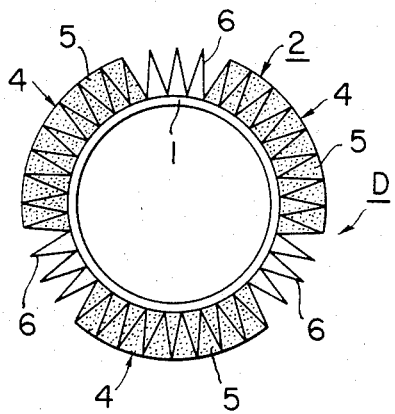
FIG. 3 is an end face view of the filter without an end plate.

Furthermore, the filter element 2 is divided into a plurality of filtering portions 4, 4, . . . 4 in the circumferential direction as shown in FIGS. 2 and 3. In the example shown in FIG. 3, the filter element 2 is divided into three arcuate filtering portions 4, 4, 4 in cross-section. Between each two adjoining filtering portions 4 is provided a flexible portion 6 which comprises a few corrugations which can expand and contract freely.

The two opposite ends of each arcuate filtering portion 4 are solidified by filling a certain amount of setting resin 5 thereinto to form two respective solidified portions 4A, 4A extending in the circumferential direction of the filter element 2. Spaces formed on both the outside and inside of the corrugations in the portions 4A, 4A are filled with the setting resin 5.

When the filter element 2 is fitted to the support tube 1, the support tube 1 is inserted into the filter element 2 in a state wherein the element 2 is expanded radially outwardly with the flexible portions 6 expanded. On the contrary, it is, of course, possible that the expanded filter element 2 is so moved in its axial direction as to be wrapped around the stationary support tube 1.

Figure 4:
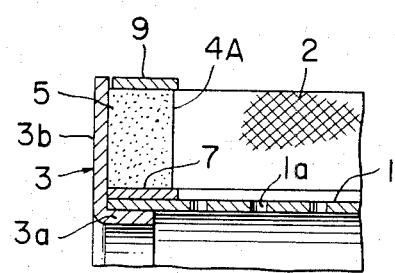
FIG. 4 is a side elevation view in vertical section of an end portion of the filter.
Figure 5:
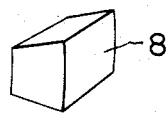
FIG. 5 is a perspective view of a filling block.
Figure 6:
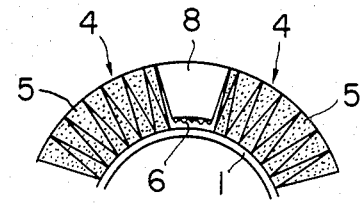
FIG. 6 is an end face view of a part of the filter.

At this time, two band shaped packings 7 are wrapped around the opposite ends of the support tube 1 in its circumferential direction, respectively, as shown in FIG. 4.

Thereafter, each of end plates 3, 3 is fixed to a respective one of the opposite ends of the support tube 1 with its flange portion 3b abutting against the corresponding end face of the filter element 2.

Subsequently, a wedge-shaped filling block 8 is forcibly inserted into the opposite ends of each flexible portion 6 while crushing the corrugations therein. Instead of the fastening block 8, the flexible portions 6 may be filled with setting resin in the same manner as the solidified portions 4A.

At last, a fastening band or strap 9 is wrapped around the solidified portions 4A and the filling blocks 8 in each end of the support tube 1 to fasten them on the support tube 1 and against the flange portion 3b for providing a good seal.

The filter D according to this invention has a construction in which the opposite ends of the filter element 2 are respectively provided with a plurality of solidified portions 4A in the form of an arc corresponding to the outer circumferential surface of the support tube 1, and the flexible portions 6 are respectively formed between the two adjoining solidified portions 4A. Accordingly, when an old filter element clogged during the filtration operation is replaced by a new one, the new element can be expanded enough to receive easily the support tube 1 therein. Thereafter, the new element is so contracted radially inwardly as to be wrapped around the support tube 1 due to the shrinkage of each flexible portion 6. At this time, as each filtering portion 4 has stable corrugations at a certain pitch because of the provision of solidified portions 4A at its opposite ends, it is not necessary to adjust or arrange the pitch of the corrugations of the filter element after it is wrapped around the support tube 1. Accordingly, the work for its replacement becomes remarkably simple. In addition, as each filtering portion 4 is previously solidified, by setting resin, at its opposite ends to form two solidified portions 4A which can provide a good seal, only the flexible portions 6 require a step to cope with the leakage of the liquid therefrom. Therefore, the opposite ends of the filter element 2 can provide a good seal.

Figure 7:
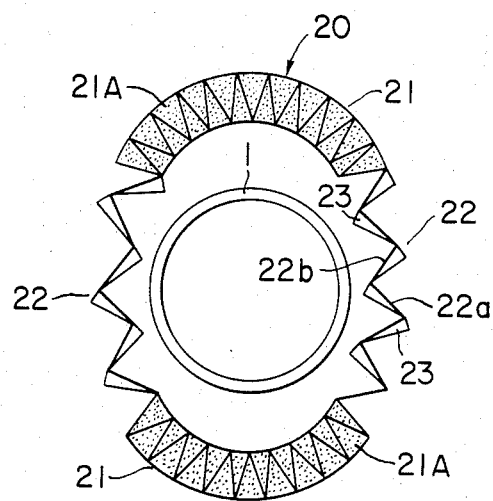
FIG. 7 is an end face view of a filter to show another example in a state wherein its filter element is expanded.
Figure 8:
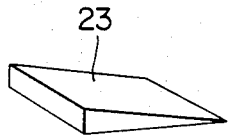
FIG. 8 is a perspective view of a piece of filling packing.
Figure 9:
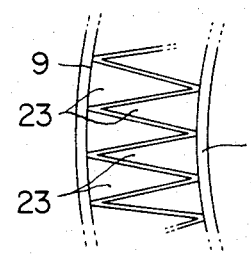
FIG. 9 is an enlarged view of a part of the end face of the filter element.

FIGS. 7 through 9 show another example of this invention. In FIG. 7, the filter element 20 has two divided filtering portions 21, 21 and two flexible portions 22, 22. At the opposite ends of each filtering portion 21 are respectively provided two solidified portions 21A, 21A in the same manner as the above example. The flexible portions 22 are disposed symmetrically with respect to the center axis of the support tube 1. In each flexible portion 22, several wedge-shaped filling packings 23, 23, . . . 23, as shown in FIG. 8, made of soft synthetic resin are attached alternately to the inclined surfaces 22a, 22b so as to fill up triangular spaces in cross-section in the flexible portions 4A when the filter element 20 is fitted to the support tube as shown in FIG. 9.

In this manner, as the several packings 23 are previously provided in each flexible portion 22, the work for fitting the filter element 20 to the support tube 1 becomes simpler than the above example. Moreover, the flexible portions 22 can provide a good seal. The fastening band 9 (FIG. 9) is used in this example, also.

The number of the filtering portions 4, 21 is determined in correspondence with the diameter of the support tube 1. The number of corrugations in each of the flexible portions 6, 22 is normally 2 to 5. However, it is not limited to this number.

What is claimed is:

1. A filter comprising:
   (a) a perforated support tube;
   (b) a tubular filter element wrapped around the support tube, said element having a plurality of corrugations in cross-section and being divided into a plurality of filtering portions in the form of corrugations in its circumferential direction so as to form a plurality of flexible portions which are also in the form of corrugations and which are capable of expanding and contracting between the two adjoining filtering portions, the opposite ends of each filtering portion being solidified by filling the spaces between the adjoining corrugations with solidifying material in the form of an arc corresponding to the peripheral surface of the support tube so that a specific pitch of the corrugations of the filtering portions can be maintained in a state wherein the adjoining ridges and the adjoining bottom valleys of the corrugations are respectively spaced apart from each other;
   (c) two end plates having flange portions and fitted to the opposite ends of the support tube so that the flange portions of the end plates face the end faces of the filter element, respectively;
   (d) a plurality of filling members inserted into the opposite ends of each flexible portion, respectively; and
   (e) means for fastening the solidified opposite ends of each filtering portion together with the filling members inserted into the opposite ends of each flexible portion to the opposite ends of the support tube.

2. A filter according to claim 1, wherein the filling members are respectively inserted into the opposite ends of each flexible portion with corrugations crushed therein.

3. A filter according to claim 1, wherein the solidifying material is a setting resin.

4. A filter according to claim 1, wherein the opposite ends of each flexible portion are filled with a setting resin after the filter element is wrapped around the support tube.

5. A filter according to claim 1, wherein the plurality of filling members comprise a plurality of filling packings so provided in the opposite ends of each flexible portion as to fill up spaces of the corrugations located therein when the filter element is wrapped around the support tube.

6. A filter according to claim 5, wherein the filling packings are of a wedge-shape and made of soft synthetic resin.

* * * * *